US012573857B2

(12) United States Patent
Taguchi et al.

(10) Patent No.: US 12,573,857 B2
(45) Date of Patent: Mar. 10, 2026

(54) CHARGER WITH POWER PULSATION ABSORPTION CIRCUIT AND CONTROLLER FOR SAME

(71) Applicant: Yazaki Corporation, Tokyo (JP)

(72) Inventors: Noritaka Taguchi, Susono (JP); Ryo Gondo, Susono (JP); Daisuke Maezaki, Susono (JP); Yoshiya Ohnuma, Nagaoka (JP); Shunsuke Takuma, Nagaoka (JP); Shohei Komeda, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 603 days.

(21) Appl. No.: 18/163,492

(22) Filed: Feb. 2, 2023

(65) Prior Publication Data

US 2023/0275451 A1      Aug. 31, 2023

(30) Foreign Application Priority Data

Feb. 28, 2022    (JP) ................................. 2022-028889

(51) Int. Cl.
$H01M\ 10/46$ (2006.01)
$H02J\ 7/06$ (2006.01)
(Continued)

(52) U.S. Cl.
CPC ................ H02J 7/06 (2013.01); H02J 7/345 (2013.01); H02J 7/927 (2026.01); H02M 1/08 (2013.01);
(Continued)

(58) Field of Classification Search
CPC ............ H02M 1/08; H02M 1/15; H02M 7/06; H02M 1/4208; H02M 3/33573;
(Continued)

(56) References Cited

U.S. PATENT DOCUMENTS

2022/0060045 A1 * 2/2022 Imoto ............... H02M 3/33573

FOREIGN PATENT DOCUMENTS

CN      114079315 A    *  2/2022  .............. H02J 7/345
DE   102021121325 A1 *  2/2022  .............. H02J 7/345

OTHER PUBLICATIONS

Shohei Komeda, et al., "A Dual Active Bridge AC-DC Converter with an Active Energy Buffer", Material of the Technical Committee on Semiconductor Power Converter, 2021, SPC-21-003, pp. 13-18.

(Continued)

*Primary Examiner* — Edward Tso

(74) *Attorney, Agent, or Firm* — Sughrue Mion, PLLC

(57) ABSTRACT

A charger includes: a rectifier including input terminals, a cathode terminal and an anode terminal, wherein the input terminals are configured for connection to an AC power supply; a DC/DC converter including a first terminal, a second terminal and output terminals, the first terminal being configured to be connected to the cathode terminal of the rectifier, the second terminal being configured to be connected to the anode terminal of the rectifier, wherein the output terminals are configured for connection to a battery; and a power pulsation absorbing circuit including a first to third diodes, an inductor, a capacitor, a first switch and a second switch, wherein the DC/DC converter, the first and second switch are controlled to obtain a constant sum of a power outputted from the AC power supply and a power outputted from the capacitor during increasing a voltage outputted from the AC power supply.

20 Claims, 9 Drawing Sheets

(51) Int. Cl.

| | |
|---|---|
| *H02J 7/34* | (2006.01) |
| *H02J 7/90* | (2026.01) |
| *H02M 1/08* | (2006.01) |
| *H02M 3/335* | (2006.01) |
| *H02M 7/06* | (2006.01) |

(52) U.S. Cl.
CPC ... *H02M 3/33573* (2021.05); *H02M 3/33576* (2013.01); *H02M 7/06* (2013.01); *H02J 2207/20* (2020.01); *H02J 2207/50* (2020.01)

(58) Field of Classification Search
CPC ...... H02M 1/007; H02M 3/33576; H02J 7/06; H02J 7/345; H02J 7/00711; H02J 7/02; H02J 2207/50; H02J 2207/20; H02J 7/927
USPC ....... 320/107, 127, 128, 134, 135, 136, 139, 320/140
See application file for complete search history.

(56) References Cited

OTHER PUBLICATIONS

Shohei Komeda et al, "A Variable Frequency Control Method for a Dual-Active-Bridge AC-DC Converter with an Active Energy Buffer", Lecture Papers Collection of 2021 IEE-Japan Industry Applications Society Conference, 2021, vol. 1, No. 30, pp. 13-18.

* cited by examiner

| | SWITCH S21 | SWITCH S22 | SWITCH S23 | SWITCH S24 | SWITCH S25 | SWITCH S26 | SWITCH S27 | SWITCH S28 | SWITCH S31 |
|---|---|---|---|---|---|---|---|---|---|
| MODE 1 | on | off | off | on | off | on | on | off | on |
| MODE 2 | on | off | off | on | on | off | off | on | on |
| MODE 3 | on | off | off | on | on | off | off | on | off |
| MODE 4 | off | on | on | off | on | off | off | on | on |
| MODE 5 | off | off | off | off | off | off | off | off | off |
| MODE 6 | off | on | on | off | off | on | on | off | off |
| MODE 7 | off | on | on | off | off | on | on | off | on |

FIG. 3

| | SWITCH S21 | SWITCH S22 | SWITCH S23 | SWITCH S24 | SWITCH S25 | SWITCH S26 | SWITCH S27 | SWITCH S28 | SWITCH S31 |
|---|---|---|---|---|---|---|---|---|---|
| MODE 1 | on | off | off | on | off | on | on | off | on |
| MODE 2 | on | off | off | on | on | off | off | on | on |
| MODE 3 | on | off | off | on | on | off | off | on | off |
| MODE 4 | off | on | on | off | on | off | off | on | on |
| MODE 5 | off | off | off | off | off | off | off | off | off |
| MODE 6 | off | on | on | off | off | on | on | off | off |
| MODE 7 | off | on | on | on | off | on | on | off | on |
| MODE 8 | on | off | off | on | off | on | on | off | off |
| MODE 9 | off | on | on | off | on | off | off | on | off |

FIG. 7

CHARGER WITH POWER PULSATION ABSORPTION CIRCUIT AND CONTROLLER FOR SAME

BACKGROUND OF THE INVENTION

Technical Field

The present invention relates to a charger.

Background Art

Various isolated single phase AC/DC converters have been considered as chargers for electric vehicles. Generally, a circuit arrangement is utilized as a charger for an electric vehicle, wherein the circuit arrangement includes a diode rectifier with a power factor correction (PFC) circuit, a high capacitance capacitor for a DC link, and high frequency isolated DC/DC converter. The high capacity capacitor for a DC link is required to have a capacitance which enables power pulsation due to a single-phase AC power supply to be absorbed. With the above-mentioned circuit arrangement, it is difficult to reduce a size of the capacitor.

As a compact charger which enables power pulsation to be absorbed, Non-Patent Document 1 discloses a charging circuit including a Dual-Active-Bridge (DAB) converter with an active buffer added, and control of such a charging circuit, the active buffer being intended for power pulsation absorption.

CITATION LIST

Non-Patent Literature

Non-Patent Document 1; Shohei Komeda, Yoshiya Ohnuma, "A Dual Active Bridge AC-DC Converter with an Active Energy Buffer", Material of the Technical Committee on Semiconductor Power Converter, 2021, SPC-21-003, pp. 13-18

SUMMARY OF THE INVENTION

However, the control according to Non-Patent Document 1 is applicable to voltage decrease operation, but may not be applicable to voltage increase operation.

An objective of the present invention is to provide a compact charger which enables pulsation of power to be absorbed.

In order to achieve the objective, a charger according to the present invention includes a rectifier including two input terminals, a cathode terminal and an anode terminal, wherein the two input terminals are configured for connection to an AC power supply; a DC/DC converter including a first terminal, a second terminal and two output terminals, the first terminal being configured to be connected to the cathode terminal of the rectifier via a first line, the second terminal being configured to be connected to the anode terminal of the rectifier via a second line, wherein the output terminals are configured for connection to a battery; a power pulsation absorbing circuit including a first diode, a second diode, a third diode, an inductor, a capacitor, a first switch and a second switch; and a controller configured to control switching of a switch of the DC/DC converter and switching of the first switch and the second switch; wherein the first diode is connected between the inductor of the power pulsation absorbing circuit and one of the two input terminals of the rectifier, and the second diode is connected between the inductor and another of the two input terminals of the rectifier, wherein the capacitor and the first switch are connected in series between the first line and the second line with the capacitor being arranged closer to the second line than the first switch, wherein the third diode is connected between the inductor of the power pulsation absorbing circuit and a line which connects the capacitor to the first switch, wherein the second switch is connected between the second line and a line which connects the inductor of the power pulsation absorbing circuit to the third diode, wherein the controller is configured to control the switch of the DC/DC converter, the first switch and the second switch to obtain a constant sum of a power outputted from the AC power supply and a power outputted from the capacitor during increasing a voltage outputted from the AC power supply.

The present invention enables a compact charger to be provided which can absorb pulsation of power.

BRIEF DESCRIPTION OF THE DRAWINGS

FIG. 3 shows states of each of switches in various modes;

FIG. 7 shows states of each of switches in various modes;

DETAILED DESCRIPTION OF PREFERRED EMBODIMENTS

Charger 100

Figure 1:
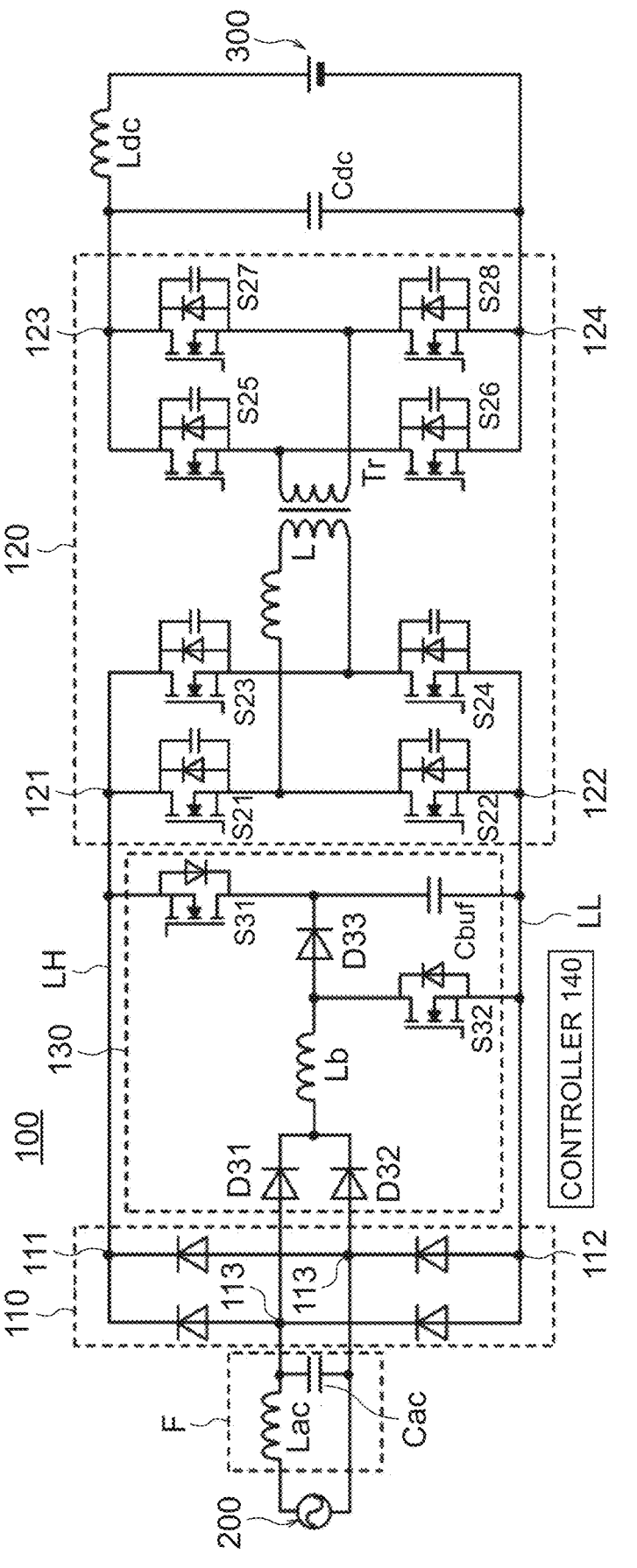
FIG. 1 shows a charger 100 according to an embodiment of the present invention.

FIG. 1 shows a charger 100 according to an embodiment of the present invention. The charger 100 includes a rectifier 110, a DC/DC converter 120, a power pulsation absorbing circuit 130, and a controller 140. The charger 100 converts the single-phase AC voltage $v_S$ inputted from the single-phase AC power supply 200 to a DC voltage $V_{dc}$, and outputs it to a battery 300.

The rectifier 110 includes a cathode terminal 111 and an anode terminal 112 connected to DC/DC converter 120, and two input terminals 113 for connection to the AC power supply 200. For example, the rectifier 110 is configured as a bridge diode rectifier formed by four diodes, receives an AC current applied between the two input terminals 113 connected to the AC power supply, converts the current into a DC current and outputs it from the cathode terminal 111, as shown in FIG. 1. As shown in FIG. 1, the rectifier 110 may be configured to be connected to the AC power supply 200 via a filter F, wherein the filter F includes an inductor Lac and a capacitor Cac.

For example, the DC/DC converter 120 is configured as a DAB (Dual Active Bridge) converter. The DC/DC converter 120 includes a first terminal 121, a second terminal 122, a third terminal 123 and a fourth terminal 124, the first terminal 121 being connected to the cathode terminal 111 of the rectifier 110, the second terminal 122 being connected to the anode terminal 112 of the rectifier 110, wherein the third and fourth terminals 123 and 124 are configured for connection to a positive electrode and a negative electrode of the battery 300, respectively. The DC/DC converter 120 includes a transformer Tr as well as four switches on an input side (primary side), i.e., a first switch S21, a second switch S22, a third switch S23 and a fourth switch S24, and four switches on an output side (secondary side), i.e., a fifth switch S25, a sixth switch S26, a seventh switch S27 and an eighth switch S28, wherein the transformer Tr is arranged between the four switches on the input side and the four switches on the output side. For example, each of the eight switches S21~S28 is configured as an N-channel power MOSFET (Metal-Oxide-Semiconductor Field-Effect Transistor) with a reverse polarity diode (body diode). In this case, the N-channel power MOSFET may include a snubber capacitor, as shown in FIG. 1.

The DC/DC converter 120 includes an inductor L on the primary side of the transformer Tr. This inductor L is, for example, a leakage inductor of the transformer Tr.

Further, a DC capacitor Cdc is connected between the third terminal 123 and the fourth terminal 124 of DC/DC converter 120. An inductor Ldc may be connected between the third terminal 123 of the DC/DC converter 120 and the positive electrode of the battery 300.

The power pulsation absorbing circuit 130 includes a first diode D31, a second diode D32, a third diode D33, an inductor Lb, a buffer capacitor Cbuf, a first switch S31, and a second switch S32.

The first diode D31 of power pulsation absorbing circuit 130 is connected between the inductor Lb of the power pulsation absorbing circuit 130 and one of the two input terminal 113 of the rectifier 110. The second diode D32 of power pulsation absorbing circuit 130 is connected between the inductor Lb of the power pulsation absorbing circuit 130 and the other of the two input terminal 113 of the rectifier 110. In this case, each of the first diode D31 and second diode D32 of the power pulsation absorbing circuit 130 is connected between the inductor Lb of the power pulsation absorbing circuit 130 and the input terminals 113 of the rectifier 110 so that these diodes have a forward direction extending from the input terminals 113 of the rectifier 110 to the inductor Lb. Therefore, even when the AC power supply 200 is connected to the input terminals 113 of the rectifier 110, a DC current is applied to the inductor Lb of power pulsation absorbing circuit 130.

The buffer capacitor Cbuf of the power pulsation absorbing circuit 130 and the first switch S31 are connected in series between a first line LH and a second line LL, wherein the first line LH connects the cathode terminal 111 of the rectifier 110 to the first terminal 121 of the DC/DC converter 120, and the second line LL connects the anode terminal 112 of the rectifier 110 to the second terminal 122 of the DC/DC converter 120. The buffer capacitor Cbuf is arranged closer to the second line LL, and the first switch 31 is arranged closer to the first line LH. The first switch S31 is configured as an N-channel power MOSFET (Metal-Oxide-Semiconductor Field-Effect Transistor) with a reverse polarity diode (body diode). In this case, a source and a drain of the N-channel power MOSFET may be preferably connected to the first line LH and the buffer capacitor, respectively.

The third diode D33 of the power pulsation absorbing circuit 130 is connected between line connecting the buffer capacitor Cbuf of the power pulsation absorbing circuit 130 to the first switch S31 on the one hand and the inductor Lb of the power pulsation absorbing circuit 130 on the other hand so that the third diode D33 has a forward direction along a direction extending from the inductor Lb to this line.

The second switch S32 of the power pulsation absorbing circuit 130 is connected between the second line LL and a line connecting the inductor Lb of the power pulsation absorbing circuit 130 to the third diode D33. The second switch S32 is configured as an N-channel power MOSFET (Metal-Oxide-Semiconductor Field-Effect Transistor) with a reverse polarity diode (body diode). In this case, a drain of the N-channel power MOSFET may be preferably connected to the line connecting the inductor Lb of the power pulsation absorbing circuit 130 to the third diode D33, wherein a source of the N-channel power MOSFET may be preferably connected to the second line LL.

The controller 140 controls switching of the switches S21 to S28 of the DC/DC converter 120 as well as switching of the switches S31 and S32 of the power pulsation absorbing circuit 130.

Since the power pulsation absorbing circuit 130 includes a first diode D31, a second diode D32, a third diode D33, an inductor Lb, a buffer capacitor Cbuf, a first switch S31, and a second switch S32, the power pulsation absorbing circuit 130 may serve as a power factor correction (PFC) circuit. Therefore, according to the present embodiment, control is possible which provides the following sinusoidal voltage $v_S$ and sinusoidal current is to the charger 100 from the AC power supply 200:

$$v_S(t) = \sqrt{2} V_S \sin \omega_S t$$

$$i_S(t) = \sqrt{2} I_S \sin \omega_S t$$

wherein $V_S$ indicates an effective value of the power supply voltage and $I_S$ indicates an effective value of the power supply current.

Figure 2:
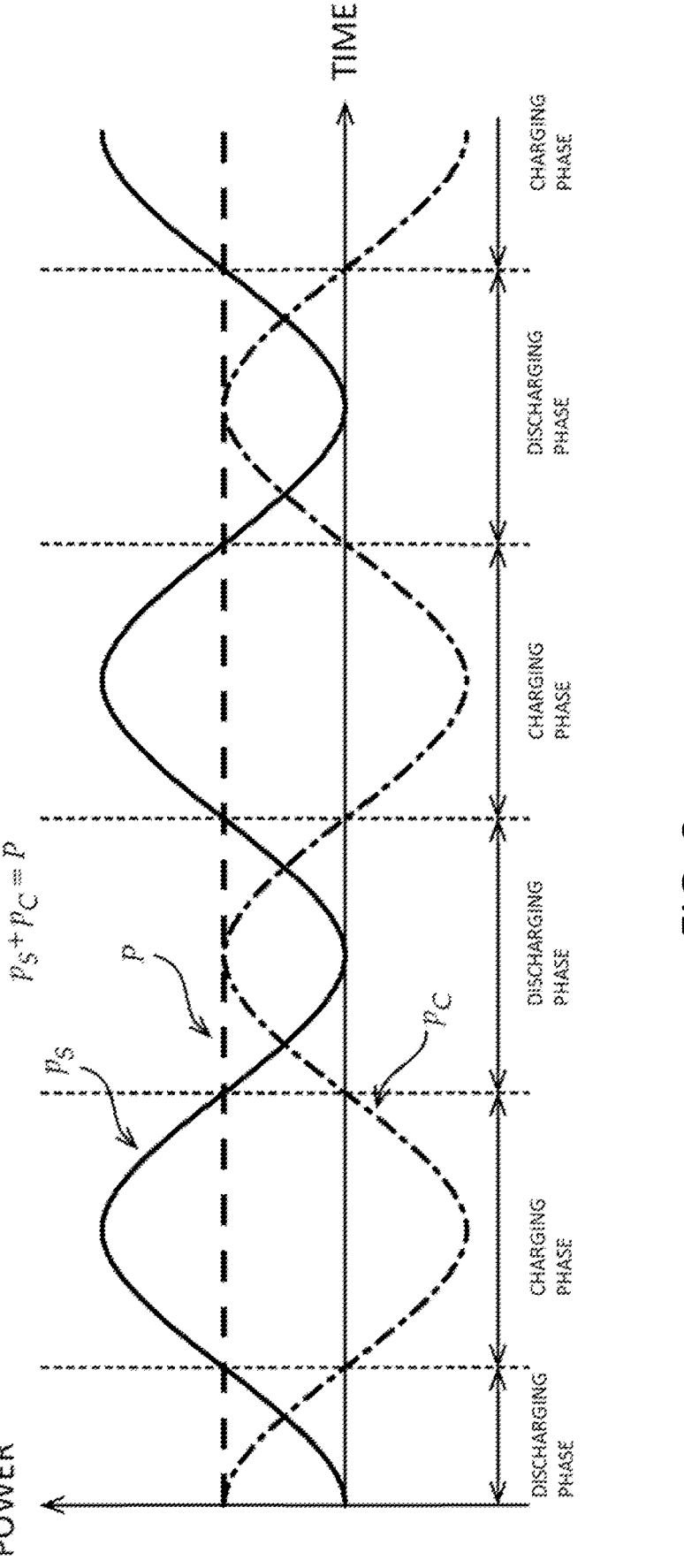
FIG. 2 shows a relation between an instantaneous power $p_s$ outputted from an AC power supply and an instantaneous power $p_c$ outputted from a buffer capacitor Cbuf.

In this case, an instantaneous power $p_S$ outputted from the AC power supply 200 is formed by a sum of an average power P ($=V_S I_S$) and a pulsation component $p_{rip}(t)$ ($=-V_S I_S \cos 2\omega_S t$) as shown below, wherein the instantaneous power $p_S$ pulsates around the average power P (dashed line in FIG. 2) with an angular frequency which is twice as high as an angular frequency $\omega$ of the AC, as shown with a solid line in FIG. 2.

$$p_S(t) = v_S i_S = V_S I_S(1 - \cos 2\omega_S t) = P + p_{rip}(t)$$

For the above-mentioned reasons, the controller 140 controls switching of the switches S21 to S28 of the DC/DC converter 120 as well as switching of the switches S31 and S32 of the power pulsation absorbing circuit 130 to absorb power pulsation due to the AC power supply in the power pulsation absorbing circuit 130 so that a constant power is inputted to the DC/DC converter 120.

In this case, the charger 100 according to the present embodiment is provided such that different controls are applied for the instantaneous power from the AC power supply 200 being higher than the average power ($p_S$>P) and for the instantaneous power being lower than the average power ($p_S$<P).

In the case of the instantaneous power $p_S$ from the AC power supply being higher than the average power P ($p_S$>P), switching of the eight switches S21 to S28 of the DC/DC converter 120 and the two switches S31 and S32 of the power pulsation absorbing circuit 130 are controlled to charge the pulsation component $p_{rip}$ of the instantaneous power $p_S$ from the AC power supply 200 to the buffer capacitor Cbuf via the inductor Lb of the power pulsation absorbing circuit 130, whereby only the average power P of the power outputted from the AC power supply may be provided to the DC/DC converter 120. This means that according to the present embodiment, the buffer capacitor Cbuf is charged in a phase in which a higher instantaneous power $p_S$ than the average power P is outputted from the AC power supply (charging phase), wherein a negative instantaneous power $p_C$ is outputted from the buffer capacitor Cbuf, as shown with a dashed dotted line in FIG. 2.

On the other hand, in the case of the instantaneous power $p_S$ from the AC power supply 200 being lower than the average power P ($p_S$<P), switching of the eight switches S21 to S28 of the DC/DC converter 120 and the first switch S31 of the power pulsation absorbing circuit 130 are controlled while maintaining the second switch S32 of the power pulsation absorbing circuit 130 in an off-state to actively discharge the buffer capacitor Cbuf via the first switch S31. This compensates the pulsation component $p_{rip}$, i.e., a difference between the instantaneous power $p_S$ and the average power P outputted from the AC power supply 200 to input the average power P to the DC/DC converter 120. This means that according to the present embodiment, the buffer capacitor Cbuf is discharged in a phase in which a lower instantaneous power $p_S$ than the average power P is outputted from the AC power supply (discharging phase), wherein a positive instantaneous power $p_C$ is outputted from the buffer capacitor Cbuf, as shown with a dashed dotted line in FIG. 2.

In other words, according to the present embodiment, the controller 140 controls switching of the switches S21 to S28 of the DC/DC converter 120, the switches S31 and S32 of the power pulsation absorbing circuit 130 to obtain a constant sum of the instantaneous power $p_S$ outputted from the AC power supply 200 and the instantaneous power $p_C$ outputted from the buffer capacitor Cbuf.

In this manner, the present embodiment is provided such that the buffer capacitor Cbuf is actively discharged during the discharging phase. Consequently, the present embodiment enables an amount of power accumulated in the buffer capacitor Cbuf (i.e., capacitance of the buffer capacitor Cbuf) to be limited, whereby the buffer capacitor Cbuf can be reduced in size.

Further, according to the present embodiment, the second switch S32 is activated only during the charging phase. Consequently, the present embodiment enables an amount of power accumulated in the inductor Lb (i.e., inductance of the inductor Lb) to be limited, whereby the inductor Lb can be reduced in size.

Further, according to the present embodiment, a power without pulsation is inputted to the DC/DC converter 120. Consequently, the present embodiment enables the transformer Tr of the DC/DC converter 120 and/or the DC capacitor Cdc to be reduced in size.

In this manner, the present embodiment enables passive elements to be reduced in size, for example capacitors and inductors. Consequently, the present embodiment enables a compact charger to be provided which can absorb pulsation of power.

Switching Modes and Operation Waveform

The controller 140 controls switching of the switches S21 to S28 of the DC/DC converter 120 and the first switch S31 of the power pulsation absorbing circuit 130 according to seven modes to obtain an operation waveform $i_L$ of the inductor L of the DC/DC converter 120 which is approximable by a rectangular waveform. FIG. 3 shows respective states of each of switches in the seven modes. The seven modes a mode (mode 5) in which the switches S21 to S28 of the DC/DC converter 120 and the first switch S31 of the power pulsation absorbing circuit 130 are all switched off.

Figure 4:
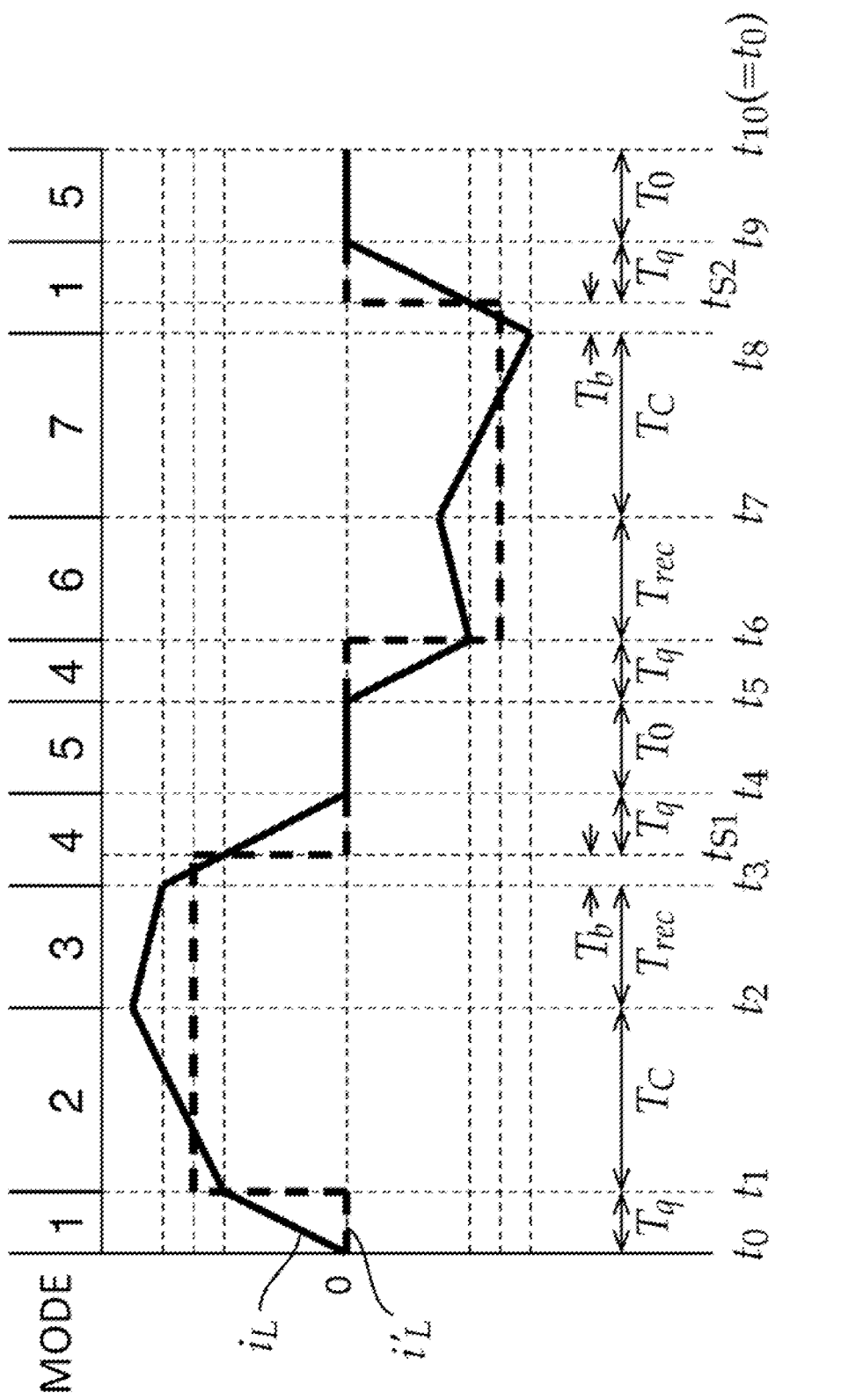
FIG. 4 shows an operation waveform $i_L$ of an inductor L of a DC/DC converter 120 according to the embodiment and a corresponding equivalent rectangular waveform $i_L'$ (voltage decrease sequence)

FIG. 4 shows an operation waveform $i_L$ of an inductor L of a DC/DC converter 120 according to the present embodiment and a corresponding equivalent rectangular waveform $i_L'$. This operation waveform $i_L$ is obtained by switching the seven modes as shown in FIG. 3 to mode 1, mode 2, mode 3, mode 4, mode 5, mode 4, mode 6, mode 7, mode 1 and mode 5 in this order. In this case, a current $i_L$ is obtained in each of the seven modes as follows (see Non-Patent Document 1)

$$i_L(t) = \begin{cases} \dfrac{v_C + V_{dc}}{L}(t - t_{c1}) + i_L(t_{c1}) & \text{(Mode 1)} \\[2mm] \dfrac{v_C + V_{dc}}{L}(t - t_{c2}) + i_L(t_{c2}) & \text{(Mode 2)} \\[2mm] \dfrac{v_{rec} + V_{dc}}{L}(t - t_{c3}) + i_L(t_{c3}) & \text{(Mode 3)} \\[2mm] -\dfrac{v_C + V_{dc}}{L}(t - t_{c4}) + i_L(t_{c4}) & \text{(Mode 4)} \\[2mm] 0 & \text{(Mode 5)} \\[2mm] -\dfrac{v_{rec} + V_{dc}}{L}(t - t_{c6}) + i_L(t_{c6}) & \text{(Mode 6)} \\[2mm] -\dfrac{v_C + V_{dc}}{L}(t - t_{c7}) + i_L(t_{c7}) & \text{(Mode 7)} \end{cases}$$

wherein $t_{cn}$ (n=1 to 7) indicates a time at which switching to mode n is performed.

According to the present embodiment, in order to discharge the buffer capacitor Cbuf more actively when the first switch S31 of the power pulsation absorbing circuit 130 is in an on-state, the controller 140 controls a voltage $v_C$ applied to the buffer capacitor Cbuf such that the voltage $v_C$ is always higher than an instantaneous voltage $v_{rec}$ outputted from the rectifier 110. Therefore, according to the present embodiment, the voltage $v_C$ applied to the buffer capacitor Cbuf has a value which is different from the instantaneous voltage $v_{rec}$ of the rectifier 110, and modes 2 and 3 have different gradients of the operation waveform $i_L$. Similarly, modes 6 and 7 have different gradients of the operation waveform $i_L$. In this manner, the present embodiment enables operation waveforms to be generated which are asymmetrical with respect to $i_L$=0 in positive and negative waveforms, as shown in FIG. 4.

For the operation waveform $i_L$ as shown in FIG. 4, it is possible to approximate it by an equivalent rectangular waveform $i_L'$ if $t_0$ to $t_{10}$ are set such that $|t_0-t_1|=|t_5-t_6|$, $|t_1-t_2|=|t_7-t_8|$, $|t_2-t_3|=|t_6-t_7|$, $|t_3-t_4|=|t_8-t_9|$, and if $t_{S1}$ and $t_{S2}$ are set between $t_3$ and $t_4$ and between $t_8$ and $t_9$ respectively such that $|t_0-t_1|=|t_{S1}-t_4|=|t_{S2}-t_9|$.

$$i_L'(t) = \begin{cases} \dfrac{i_L(t_1) + i_L(t_3)}{2} = I_L' & (t_1 \leq t \leq t_{S1}) \\[2mm] -I_L' & (t_6 \leq t \leq t_{S2}) \\[2mm] 0 & (t_0 \leq t < t_1, t_{S1} < t < t_6, t_{S2} < t < t_{10}) \end{cases}$$

If phases from $t_0$ to $t_1$, from $t_{S1}$ to $t_4$, from $t_5$ to $t_6$, and from $t_{S2}$ to $t_9$ of the equivalent rectangular waveform $i_L{}'$ are defined as reactive current phases $T_q$, phases from $t_1$ to $t_2$ and from $t_7$ to $t_8$ are defined as buffer capacitor discharge current phases $T_C$, phases from $t_2$ to $t_3$ and from $t_6$ to $t_1$ are defined as power supply current phases $T_{rec}$, phases from $t_3$ to $t_{S1}$ and from $t_8$ to $t_{S2}$ are defined as current balance phases $T_b$, and phases from $t_4$ to $t_5$ and from $t_9$ to $t_{10}$ are defined as zero current phases $T_0$, a duty cycle for each of the phases within a switching period $T_{SW}$ is as follows:

$$
\begin{cases}
D_q = \dfrac{2T_q}{T_{SW}} = \dfrac{2I_L'L}{(v_C + V_{dc})T_{SW}} - \dfrac{D_b}{2} \\[2mm]
D_C = \dfrac{2T_C}{T_{SW}} = \dfrac{i_C}{I_L'} + D_b = \dfrac{(v_{rec} - V_{dc})i_{rec} + (v_C + V_{dc})i_C}{2V_{dc}I_L'} \\[2mm]
D_{rec} = \dfrac{2T_{rec}}{T_{SW}} = \dfrac{i_{rec}}{I_L'} \\[2mm]
D_b = \dfrac{2T_b}{T_{SW}} = \dfrac{(v_{rec} - V_{dc})i_{rec} + (v_C + V_{dc})i_C}{2V_{dc}I_L'} \\[2mm]
D_0 = \dfrac{2T_0}{T_{SW}} = 1 - (2D_q + D_C + D_{rec} + D_b)
\end{cases} \tag{1}
$$

The duty cycle of each of the phases can be obtained by giving $i_{rec}$, $i_C$, $v_C$ and $V_{dc}$, $I_L'$ as set values. The obtained duty cycles of phases may be used to determine a control rule for the operation waveform $i_L$ in FIG. 4. Among these set values, set values $i_{rec}{}^*$ and $i_C{}^*$ for $i_{rec}$ and $i_C$ are switched as follows for the discharging phase and charging phase, wherein the power pulsation absorbing circuit 130 is operated to function as a PFC circuit and as a circuit for absorbing power pulsation:

$$
i_{rec}^* = \begin{cases}
\sqrt{2}\,\dfrac{P}{V_S}|\sin\omega_S t| & \text{(Discharging phase)} \\[3mm]
\dfrac{P}{\sqrt{2}\,V_S|\sin\omega_S t|} & \text{(Charging phase)}
\end{cases}
$$

$$
i_C^* = \begin{cases}
\dfrac{P}{v_C}\cos 2\omega_S t & \text{(Discharging phase)} \\[2mm]
0 & \text{(Charging phase)}
\end{cases}
$$

Switching Control during Voltage Increase Operation

Figure 5:
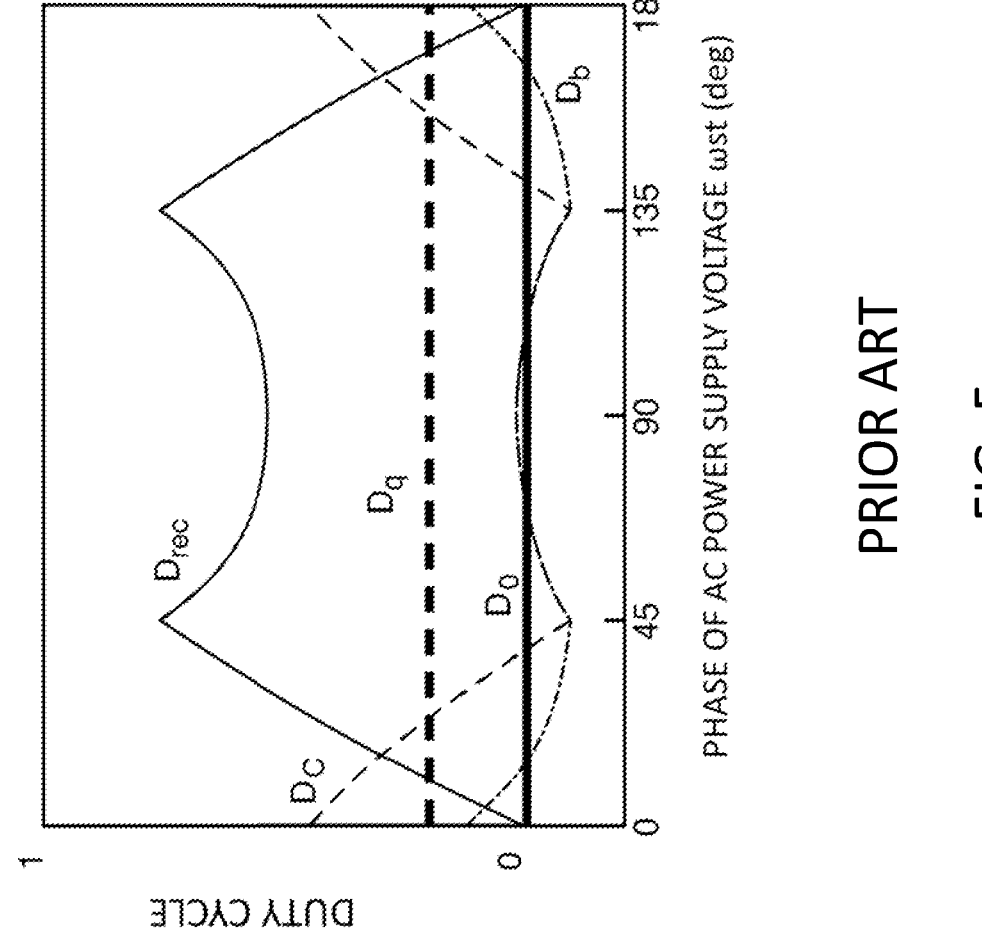
FIG. 5 shows an example for calculation of duty cycles of various phases according to a conventional control method.

In order to operate the charger 100 by performing the above-described control, all the duty cycles in the above formulas (1) should be positive. During voltage decrease operation (i.e., $V_S \geq V_{dc}$), all the duty cycles in the formulas (1) are positive. However, during voltage increase operation (i.e., $V_S < V_{dc}$), the duty cycle $D_b$ in the current balance phase $T_b$ and the duty cycle $D_C$ in the buffer capacitor discharge current phase $T_C$ may be negative, as shown in FIG. 5. In the example as shown in FIG. 5, both of the duty cycle $D_b$ in the current balance phase $T_b$ and the duty cycle $D_C$ in the buffer capacitor discharge current phase $T_C$ are positive at a phase $\omega_S t$ of 0 degree of the AC power supply voltage $v_S$. However, at the phase $\omega_S t$ of approximately 15 degrees of the AC power supply voltage $v_S$, the duty cycle $D_b$ in the current balance phase $T_b$ is negative, and at the phase $\omega_S t$ of approximately 45 degrees of the AC power supply voltage $v_S$, the duty cycle $D_C$ in the buffer capacitor discharge current phase $T_C$ is negative. When the duty cycle $D_b$ in the current balance phase $T_b$ is negative, the following is obtained according to the formula (1)

$$
(v_{rec} - V_{dc})i_{rec} + (v_C - V_{dc})i_C < 0 \tag{2}
$$

And when the duty cycle $D_C$ in the buffer capacitor discharge current phase $T_C$ is negative, the following is obtained according to the formula (1):

$$
(v_{rec} - V_{dc})i_{rec} + (v_C - V_{dc})i_C < 0 \tag{3}
$$

Therefore, according to the present embodiment, a different switching control is applied in the case of the duty cycle $D_b$ in the current balance phase $T_b$ being negative (i.e., the above formula (2) is fulfilled), and in the case of the duty cycle $D_C$ in the buffer capacitor discharge current phase $T_C$ being negative (i.e., the above formula (3) is fulfilled), a further different switching control is applied. Hereinafter, the control in the case of both formulas (2) and (3) being not fulfilled, i.e., the control as described above, shall be referred to as "voltage decrease sequence", the control in the case where formula (2) is fulfilled and formula (3) is not fulfilled shall be referred to as "voltage increase sequence I", and the control in the case of both formulas (2) and (3) being fulfilled shall be referred to as "voltage increase sequence II".

Voltage Increase Sequence I

Figure 6:
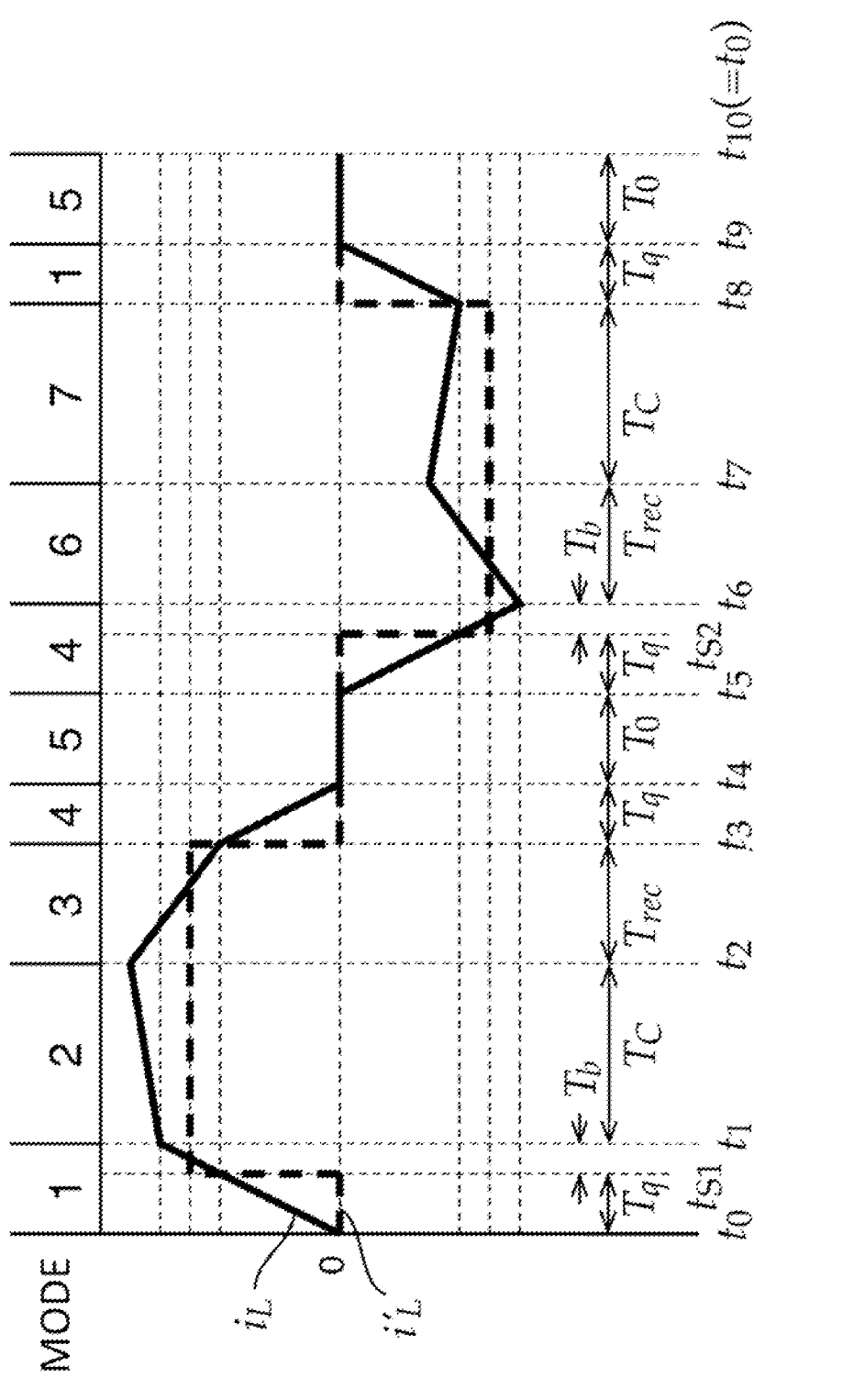
FIG. 6 shows an operation waveform $i_L$ of an inductor L of a DC/DC converter 120 according to the embodiment and a corresponding equivalent rectangular waveform $i_L'$ (voltage increase sequence I)

In the operation waveform $i_L$ as shown in FIG. 4, $i_L(t_1) \leq i_L(t_3)$. However, when the duty cycle $D_b$ in the current balance phase $T_b$ is negative (i.e., the above formula (2) is fulfilled), this results in $i_L(t_1) \geq i_L(t_3)$ in the operation waveform $i_L$, as shown in FIG. 6. Therefore, according to the present embodiment, in the case where formula (2) is fulfilled and formula (3) is not fulfilled, $t_0$ to $t_{10}$ are set such that $|t_0 - t_1| = |t_5 - t_6|$, $|t_1 - t_2| = |t_7 - t_8|$, $|t_2 - t_3| = |t_6 - t_7|$, $|t_3 - t_4| = |t_8 - t_9|$, and $t_{S1}$ and $t_{S2}$ are set between $t_0$ and $t_1$ and between $t_5$ and $t_6$ respectively such that $|t_0 - t_{S1}| = |t_3 - t_4| = |t_5 - t_{S2}|$, and the operation waveform $i_L$ is then approximated by the following equivalent rectangular waveform $i_L{}'$:

$$
i_L'(t) = \begin{cases}
\dfrac{i_L(t_1) + i_L(t_3)}{2} = I_L' & (t_{S1} \leq t \leq t_3) \\[3mm]
-I_L' & (t_{S2} \leq t \leq t_8) \\[2mm]
0 & (t_0 \leq t < t_{S1},\, t_3 < t < t_{S2},\, t_8 < t < t_{10})
\end{cases}
$$

If phases from t0 to $t_{S1}$, from $t_3$ to $t_4$, from $t_5$ to $t_{S2}$, and from $t_8$ to $t_9$ of the equivalent rectangular waveform $i_L{}'$ are defined as reactive current phases $T_q$, phases from $t_1$ to $t_2$ and from $t_7$ to $t_8$ are defined as buffer capacitor discharge current phases $T_C$, phases from $t_2$ to $t_3$ and from $t_6$ to $t_7$ are defined as power supply current phases $T_{rec}$, phases from $t_{S1}$ to $t_1$ and from $t_{S2}$ to $t_6$ are defined as current balance phases $T_b$, and phases from $t_4$ to $t_5$ and from $t_{10}$ to $t_{10}$ are defined as zero current phases $T_0$, a duty cycle for each of the phases within a switching period $T_{SW}$ is as follows:

$$
\begin{cases}
D_q = \dfrac{2I_L'L}{(v_C + V_{dc})T_{SW}} - \dfrac{D_b}{2} \\[2mm]
D_C = \dfrac{i_C}{I_L'} - D_b = \dfrac{(v_{rec} - V_{dc})i_{rec} + (v_C + V_{dc})i_C}{2V_{dc}I_L'} \\[2mm]
D_{rec} = \dfrac{i_{rec}}{I_L'} \\[2mm]
D_b = -\dfrac{(v_{rec} - V_{dc})i_{rec} + (v_C + V_{dc})i_C}{2V_{dc}I_L'} \\[2mm]
D_0 = 1 - (2D_q + D_C + D_{rec} + D_b)
\end{cases} \tag{4}
$$

Similarly, in the voltage increase sequence I, the duty cycle of each of the phases can be obtained by giving $i_{rec}$, $i_C$, $v_C$ and $V_{dc}$、 $I_L'$ as set values. The obtained duty cycles of phases may be used to determine a control rule for the operation waveform $i_L$ in FIG. 6.

Voltage Increase Sequence II

Figure 8:
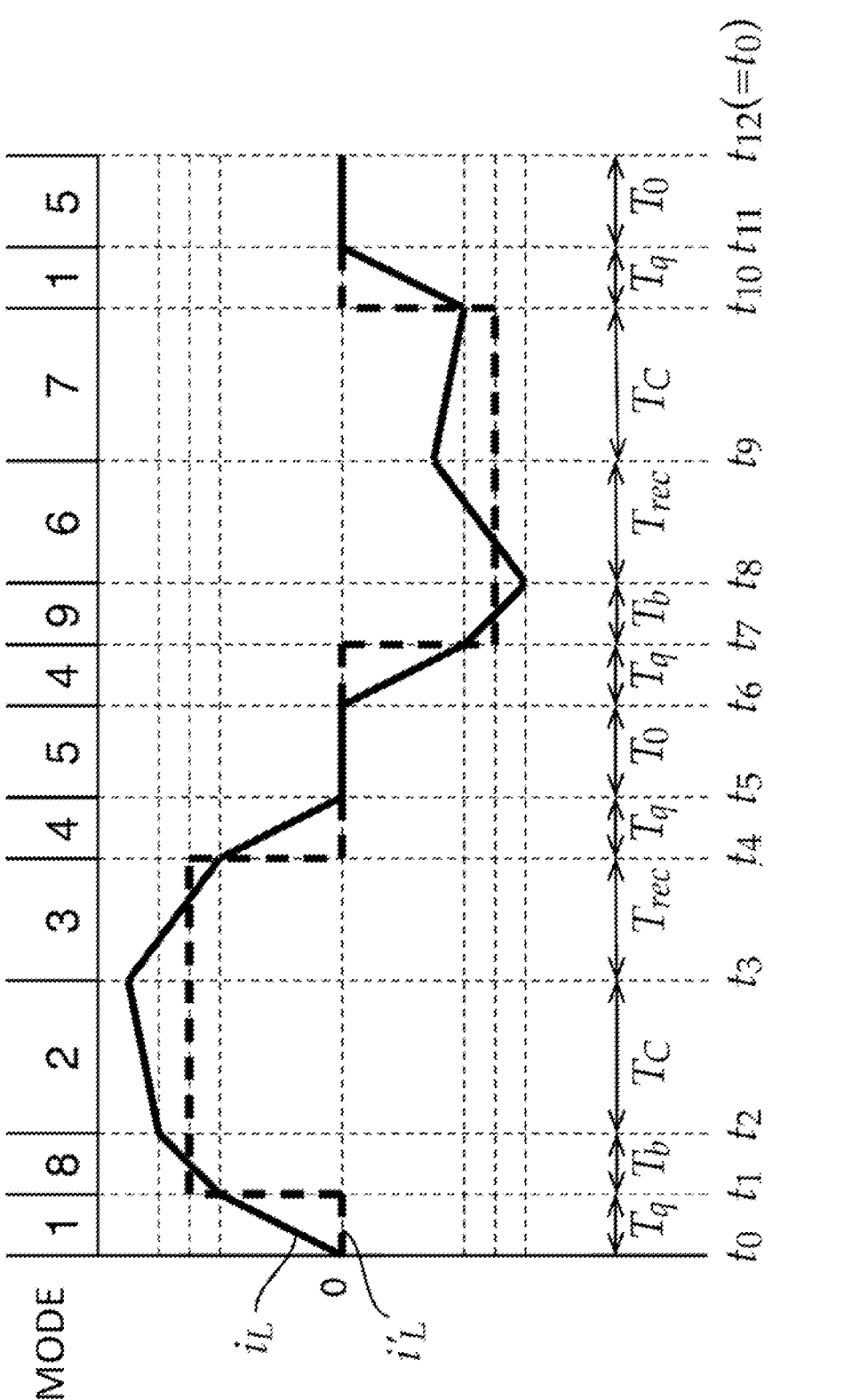
FIG. 8 shows an operation waveform $i_L$ of an inductor L of a DC/DC converter 120 according to the embodiment and a corresponding equivalent rectangular waveform $i_L'$ (voltage increase sequence II)

Further, according to the present embodiment, in the case of both formulas (2) and (3) being fulfilled, switching of the switches S21 to S28 of the DC/DC converter 120 and the first switch S31 of the power pulsation absorbing circuit 130 is controlled according to nine modes as shown in FIG. 7 which include two modes in addition to the seven modes as shown in FIG. 3. Such control results in an operation waveform $i_L$ as shown in FIG. 8. The operation waveform $i_L$ as shown in FIG. 8 is obtained by switching the nine modes as shown in FIG. 7 to mode 1, mode 8, mode 2, mode 3, mode 4, mode 5, mode 4, mode 9, mode 6, mode 7, mode 1 and mode 5 in this order.

Then, for the operation waveform $i_L$ as shown in FIG. 8, it is possible to approximate it by an equivalent rectangular waveform $i_L'$ if $t_0$ to $t_{12}$ are set such that $|t_0-t_1|=|t_6-t_7|=$, $|t_1-t_2|=|t_7-t_8|=$, $|t_2-t_3|=|t_9-t_{10}|=$, $|t_3-t_4|=|t_8-t_9|=$, $|t_4-t_5|=|t_{10}-t_{11}|$ and $|t_5-t_6|=|t_{11}-t_{12}|$.

$$i_L'(t) = \begin{cases} \dfrac{i_L(t_1) + i_L(t_4)}{2} = I_L' & (t_1 \leq t \leq t_4) \\ -I_L' & (t_7 \leq t \leq t_{10}) \\ 0 & (t_0 \leq t < t_1, t_4 < t < t_7, t_{10} < t < t_{12}) \end{cases}$$

If phases from $t_0$ to $t_1$, from $t_4$ to $t_5$, from $t_6$ to $t_7$ and from $t_{10}$ to $t_{11}$ of the equivalent rectangular waveform $i_L'$ are defined as reactive current phases $T_q$, phases from $t_2$ to $t_3$ and from $t_9$ to $t_{10}$ are defined as buffer capacitor discharge current phases $T_C$, phases from $t_3$ to $t_4$ and from $t_8$ to $t_9$ are defined as power supply current phases $T_{rec}$, phases from $t_1$ to $t_2$ and from $t_7$ to $t_8$ are defined as current balance phases $T_b$, and phases from $t_5$ to $t_6$ and from $t_{11}$ to $t_{12}$ are defined as zero current phases $T_0$, a duty cycle for each of the phases within a switching period $T_{SW}$ is as follows:

$$\begin{cases} D_q = \dfrac{2I_L'L}{(v_C + V_{dc})T_{SW}} - \dfrac{v_{rec} + V_{dc}}{v_C + V_{dc}}\dfrac{D_b}{2} \\ D_C = \dfrac{i_C}{I_L'} \\ D_{rec} = \dfrac{i_{rec}}{I_L'} - D_b = \dfrac{(v_{rec} - V_{dc})i_{rec} + (v_C + V_{dc})i_C}{2V_{dc}I_L'} \\ D_b = -\dfrac{(v_{rec} - V_{dc})i_{rec} + (v_C + V_{dc})i_C}{2V_{dc}I_L'} \\ D_0 = 1 - (2D_q + D_C + D_{rec} + D_b) \end{cases} \quad (5)$$

Similarly, in the voltage increase sequence II, the duty cycle of each of the phases can be obtained by giving $i_{rec}$, $i_C$, $v_C$ and $V_{dc}$、 $I_L'$ as set values. The obtained duty cycles of phases may be used to determine a control rule for the operation waveform $i_L$ in FIG. 8.

Operation of the Charger 100

Figure 9:
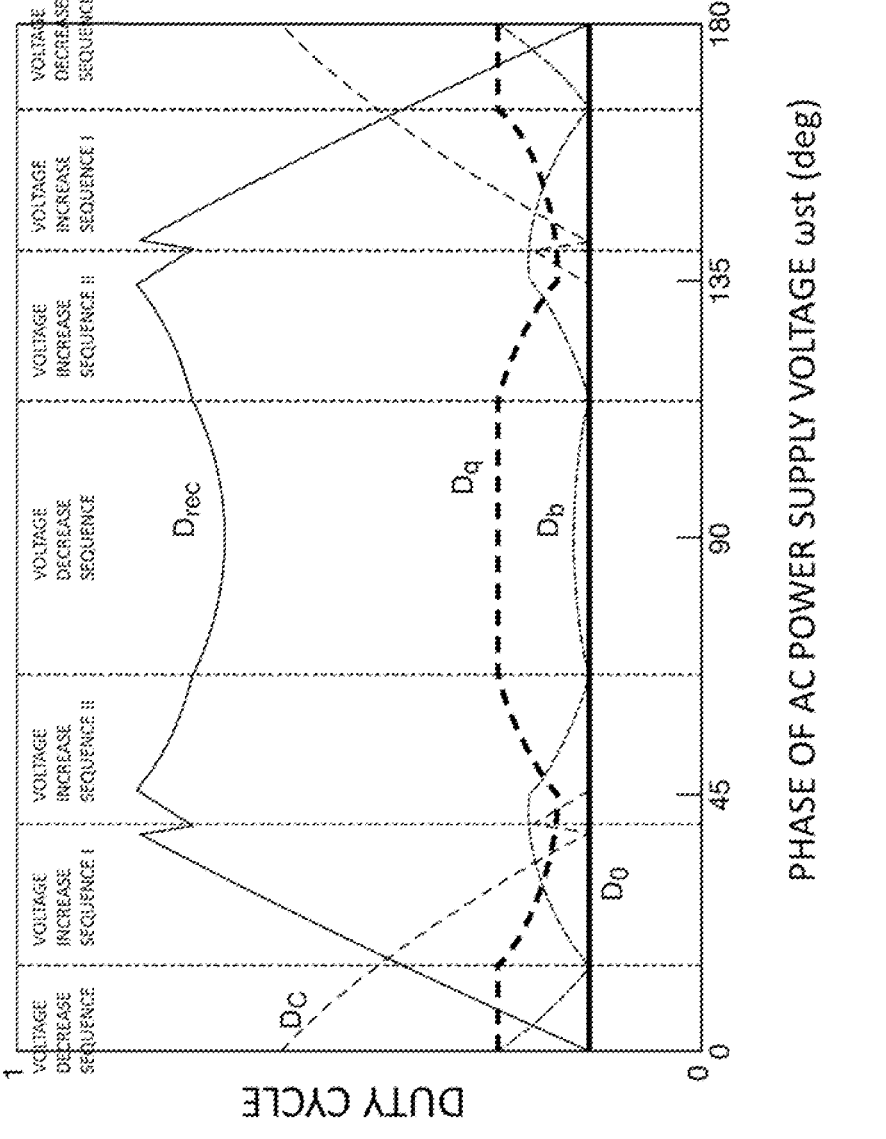
FIG. 9 shows duty cycles in the case of operating the charger 100 by using three controls, i.e., the voltage decrease sequence, voltage increase sequence I and voltage increase sequence II.

FIG. 9 shows duty cycles in the case of operating the charger 100 by using three controls, i.e., the voltage decrease sequence, voltage increase sequence I and voltage increase sequence II. As shown in FIG. 9, it is possible to operate the charger 100 also during the voltage increase operation by changing the switching control into voltage decrease sequence, voltage increase sequence I, voltage increase sequence II, voltage decrease sequence, voltage increase sequence II and voltage increase sequence I in this order.

Control of Switching Frequency $f_{SW}$

The zero current phase $T_0$ is mode 5, wherein in this phase, all the switches S21 to S28 of DC/DC converter 120 are switched off. However, the switches are practically switched off at times which are offset, wherein this offset causes residual current and thus resonance between the inductor L of the DC/DC converter 120 and parasitic capacitances of the switches S21 to S28. Therefore, switching after the zero current phase $T_0$ (switching in a changing process from mode 5 to mode 4, switching in a changing process from mode 5 to mode 1) will becomes hard switching, which results in switching loss.

Therefore, a method has been proposed in which switching frequencies $f_{SW}$ of switching of the switches S21 to S28 of the DC/DC converter 120 and/or of the switch S31 of the power pulsation absorbing circuit 130 are changed within one period of the AC voltage $v_S$ inputted from the AC power supply 200 so that no zero current phase $T_0$ exists, whereby oscillation of a current $i_L$ and a voltage $V_L$ of the inductor L is removed and hard switching is avoided after the zero current phase $T_0$ to control the charger 100 more efficiently (Shohei Komeda, Shunsuke Takuma and Yoshiya Ohnuma "A Variable Frequency Control Method for a Dual-Active-Bridge AC-DC Converter with an Active Energy Buffer", lecture papers collection of 2021 IEE-Japan Industry Applications Society Conference, Vol. 1, No. 30, pp. 13-18 (2021)).

Similarly in the present embodiment, for example, the controller 140 may control values of switching frequencies $f_{SW}$ of switching of the switches S21 to S28 of the DC/DC converter 120 and/or of the switch S31 of the power pulsation absorbing circuit 130 so that no zero current phase $T_0$ exists. By solving the above equations (1), (4) and (5) with $D_0=0$, the switching frequency $f_{SW}$ with which no zero current phase $T_0$ exists is obtained as follows.

$$f_{SW} = \frac{v_C + V_{dc}}{4I_L'L}(1 - D_{rec} - D_C) \quad (6)$$

$$f_{SW} = \frac{v_C + V_{dc}}{4I_L'L}\left(1 - D_{rec} - D_C\frac{v_C - v_{rec}}{v_C + V_{dc}}D_b\right) \quad (7)$$

Equation (6) as above corresponds to switching frequencies $f_{SW}$ for the voltage decrease sequence and voltage increase sequence I, while equation (7) as above corresponds to a switching frequency $f_{SW}$ for the voltage increase sequence II.

Set Value for Peak Value $I_L'$ of the Equivalent Rectangular Wave $i_L'$

In the above-mentioned document (see Shohei Komeda, Shunsuke Takuma and Yoshiya Ohnuma "A Variable Frequency Control Method for a Dual-Active-Bridge AC-DC Converter with an Active Energy Buffer", lecture papers collection of 2021 IEE-Japan Industry Applications Society Conference, Vol. 1, No. 30, pp. 13-18 (2021)), a method has been also proposed in which a set value for a peak value $I_L'$ of the equivalent rectangular wave $i_L'$ in a voltage decrease sequence according to the prior art is optimized to operate the charger 100 more efficiently. In this method, the set value of the peak value $I_L'$ of the equivalent rectangular waveform $i_L'$ is controlled to obtain a predetermined value $f_{min}$ of the switching frequency $f_{SW}$ (equation (6) as mentioned above) at a phase $\omega_S t$ of 45 degrees of AC power supply voltage $v_S$ so that the charger 100 is operated more efficiently.

However, during the voltage increase operation, at the phase $\omega_S t$ of 45 degrees of AC power supply voltage $v_S$, the charger 100 may be not operated with the voltage decrease sequence according to the prior art, but with the voltage increase sequence II, as shown in FIG. 9. In this case, it is not possible to use the method proposed in the above document directly. Therefore, in such a case, for example the set value of the peak value $I_L'$ of the equivalent rectangular waveform $i_L'$ is preferably controlled at the phase $\omega_S t$ of 45 degrees of AC power supply voltage $v_S$ to obtain a predetermined value $f_{min}$ of the switching frequency $f_{SW}$ in the voltage increase sequence II (equation (7) as mentioned above). In this case, the set value $I_L'^*$ of the peak value $I_L'$ of the equivalent rectangular waveform $i_L'$ is as follows:

$$I_L'^* = \frac{V_{dc} + V_{Cmin}}{8 f_{min} L} \left[ 1 - \sqrt{1 - A'} \right] \quad (8)$$

$$A' = \frac{8 f_{min} L I_S \left( V_s^2 + V_{dc}^2 + 2 V_{Cmin} V_{dc} \right)}{V_{dc} \left( V_{dc} + V_{Cmin} \right)^2}$$

$$V_{Cmin} = \sqrt{V_{Cmax}^2 - \frac{2P}{\omega_S C_{buf}}}$$

The above formula (8) is effective in the case where the switching frequency $f_{SW}$ in the voltage increase sequence II (equation (7) as mentioned above) is minimum at the phase $\omega_S t$ of 45 degrees of AC power supply voltage $v_S$. When a maximum value of the voltage $v_C$ applied to the buffer capacitor Cbuf is set to a sufficiently high value, the switching frequency $f_{SW}$ in the voltage increase sequence II (equation (7) as mentioned above) is minimum at the phase $\omega_S t$ of 45 degrees of AC power supply voltage $v_S$. On the other hand, when the maximum value of the voltage $v_C$ applied to the buffer capacitor Cbuf is reduced, the switching frequency $f_{SW}$ in the voltage increase sequence II (equation (7) as mentioned above) may be minimum at a phase $\omega_S t$ AC power supply voltage $v_S$ which is different from 45 degrees. In such a case, a set value of the peak value $I_L'$ of the equivalent rectangular waveform may be preferably determined with which a minimum value of the switching frequency $f_{SW}$ in the voltage increase sequence II (equation (7) as mentioned above) is adjusted to the predetermined value $f_{min}$.

The present invention has been described above by means of the preferable embodiment thereof. Although the invention has been described herein by presenting a specific example, various modifications and changes may be made to such an example without departing from the spirit and scope of the invention as set forth in the claims.

REFERENCE SIGNS LIST

100 Charger
110 Rectifier
120 DC/DC converter
S21-S28 Switches of the DC/DC converter
130 Power pulsation absorbing circuit
D31 First diode
D32 Second diode

D33 Third diode
Lb Inductor
Cbuf Buffer capacitor
S31 First switch
S32 Second switch
200 AC power supply
300 Battery

The invention claimed is:

1. A charger comprising:
a rectifier including two input terminals, a cathode terminal and an anode terminal, wherein the two input terminals are configured for connection to an AC power supply;
a DC/DC converter including a first terminal, a second terminal and two output terminals, the first terminal being configured to be connected to the cathode terminal of the rectifier via a first line, the second terminal being configured to be connected to the anode terminal of the rectifier via a second line, wherein the output terminals are configured for connection to a battery;
a power pulsation absorbing circuit including a first diode, a second diode, a third diode, an inductor, a capacitor, a first switch and a second switch; and
a controller configured to control switching of a switch of the DC/DC converter and switching of the first switch and the second switch;
wherein the first diode is connected between the inductor of the power pulsation absorbing circuit and one of the two input terminals of the rectifier, and the second diode is connected between the inductor and another of the two input terminals of the rectifier,
wherein the capacitor and the first switch are connected in series between the first line and the second line,
wherein the first switch is connected to the first line and the capacitor is arranged between the second line and the first switch,
wherein the third diode is connected between the inductor of the power pulsation absorbing circuit and a line which connects the capacitor to the first switch,
wherein the second switch is connected between the second line and a line which connects the inductor of the power pulsation absorbing circuit to the third diode,
wherein a first formula is defined as $(v_{rec} - V_{dc})i_{rec} + V_c - V_{dc})i_c < 0$, and a second formula is defined as $(V_{rec} - V_{dc})i_{rec} + (V_c + v_{dc})i_c < 0$,
wherein $V_{rec}$ indicates an output voltage of the rectifier, $i_{rec}$ indicates a current outputted by the rectifier, $V_{dc}$ indicates an output voltage of the charger, $V_c$ indicates a voltage applied to the capacitor, and $i_c$ indicates a current outputted by the capacitor,
wherein, when neither of the first formula or the second formula is fulfilled during a voltage increase operation of increasing a voltage outputted from the AC power supply, the controller is configured to control the switch of the DC/DC converter, the first switch and the second switch by means of a first control to obtain a constant sum of a power outputted from the AC power supply and a power outputted from the capacitor,
wherein, when the first formula is fulfilled and the second formula is not fulfilled during the voltage increase operation of increasing the voltage outputted from the AC power supply, the controller is configured to control the switch of the DC/DC converter, the first switch and the second switch by means of a second control to obtain a constant sum of the power outputted from the AC power supply and the power outputted from the capacitor, the second control being different from the first control, and wherein, when both of the first formula and the second formula are fulfilled during the voltage increase operation of increasing the voltage outputted from the AC power supply, the controller is configured to control the switch of the DC/DC converter, the first switch and the second switch by means of a third control to obtain a constant sum of the power outputted from the AC power supply and the power outputted from the capacitor, the third control being different from both of the first control and the second control.

2. The charger according to claim 1, wherein the controller is configured to control the switch of the DC/DC converter, the first switch and the second switch to obtain a larger voltage applied to the capacitor than an output voltage of the rectifier.

3. The charger according to claim 1, wherein the controller is configured to:

control the switch of the DC/DC converter, the first switch and the second switch to charge a portion of the power outputted from the AC power supply into the capacitor during a charging phase, wherein in the charging phase, an instantaneous power outputted from the AC power supply is higher than an average power outputted from the AC power supply, and control the switch of the DC/DC converter, the first switch and the second switch to discharge a power charged in the capacitor during a discharging phase, wherein in the discharging phase, the instantaneous power outputted from the AC power supply is lower than the average power outputted from the AC power supply.

4. The charger according to claim 2, wherein the controller is configured to:

control the switch of the DC/DC converter, the first switch and the second switch to charge a portion of the power outputted from the AC power supply into the capacitor during a charging phase, wherein in the charging phase, an instantaneous power outputted from the AC power supply is higher than an average power outputted from the AC power supply, and control the switch of the DC/DC converter, the first switch and the second switch to discharge a power charged in the capacitor during a discharging phase, wherein in the discharging phase, the instantaneous power outputted from the AC power supply is lower than the average power outputted from the AC power supply.

5. The charger according to claim 3, wherein the controller is configured to maintain an off-state of the second switch during the discharging phase.

6. The charger according to claim 4, wherein the controller is configured to maintain an off-state of the second switch during the discharging phase.

7. The charger according to claim 5, wherein the controller is configured to control switching of the switch of the DC/DC converter and the first switch to obtain an operation waveform of the inductor of the DC/DC converter which is approximable by a rectangular waveform.

8. The charger according to claim 6, wherein the controller is configured to control switching of the switch of the DC/DC converter and the first switch to obtain an operation waveform of the inductor of the DC/DC converter which is approximable by a rectangular waveform.

9. The charger according to claim 7, wherein the controller is configured to change switching frequencies of the switch of the DC/DC converter and the first switch during one period of an AC voltage inputted from the AC power supply.

10. The charger according to claim 8, wherein the controller is configured to change switching frequencies of the switch of the DC/DC converter and the first switch during one period of an AC voltage inputted from the AC power supply.

11. The charger according to claim 9, wherein the controller is configured to control values of the switching frequencies of the switch of the DC/DC converter and the first switch such that no period exists in which the switch of the DC/DC converter and the first switch are all switched off.

12. The charger according to claim 10, wherein the controller is configured to control values of the switching frequencies of the switch of the DC/DC converter and the first switch such that no period exists in which the switch of the DC/DC converter and the first switch are all switched off.

13. The charger according to claim 9, wherein the controller is configured to control a set value of a peak value of the rectangular waveform to obtain a minimum value of the switching frequencies which is equal to a predetermined value.

14. The charger according to claim 11, wherein the controller is configured to control a set value of a peak value of the rectangular waveform to obtain a minimum value of the switching frequencies which is equal to a predetermined value.

15. The charger according to claim 1, wherein the DC/DC converter is configured as a DAB (Dual Active Bridge) converter.

16. The charger according to claim 2, wherein the DC/DC converter is configured as a DAB (Dual Active Bridge) converter.

17. The charger according to claim 3, wherein the DC/DC converter is configured as a DAB (Dual Active Bridge) converter.

18. The charger according to claim 5, wherein the DC/DC converter is configured as a DAB (Dual Active Bridge) converter.

19. The charger according to claim 7, wherein the DC/DC converter is configured as a DAB (Dual Active Bridge) converter.

20. The charger according to claim 9, wherein the DC/DC converter is configured as a DAB (Dual Active Bridge) converter.

* * * * *